June 30, 1925.
H. C. A. POTEZ
1,544,032
SHOCK ABSORBER FOR VEHICLES
Filed Oct. 19, 1923
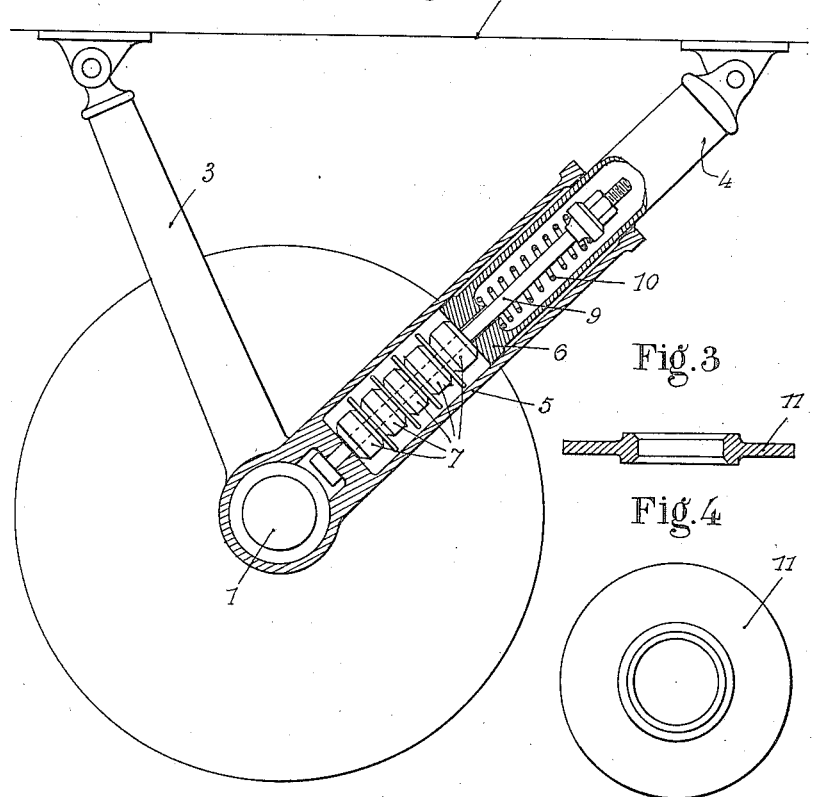
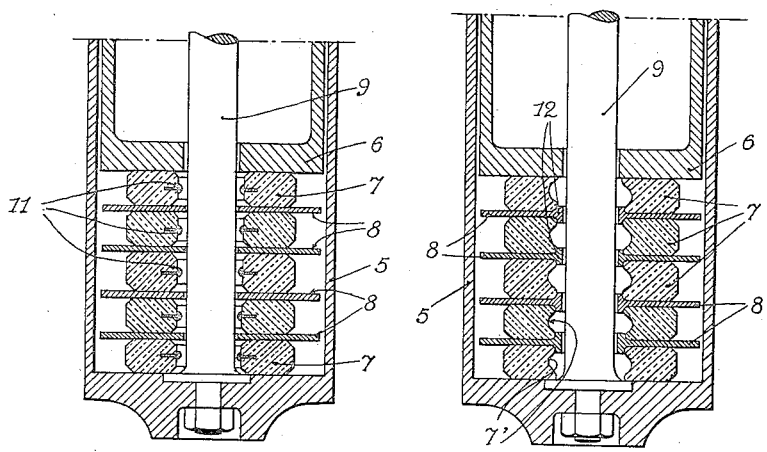
Inventor
H.C.A. Potez
By Marks & Clerk Attys.

Patented June 30, 1925.

1,544,032

UNITED STATES PATENT OFFICE.

HENRY CHARLES ALEXANDRE POTEZ, OF LEVALLOIS-PERRET, FRANCE.

SHOCK ABSORBER FOR VEHICLES.

Application filed October 19, 1923. Serial No. 669,584.

*To all whom it may concern:*

Be it known that I, HENRY CHARLES ALEXANDRE POTEZ, citizen of the French Republic, residing at Levallois-Perret, Seine, in the French Republic, have invented new and useful Improvements in Shock-Absorbers for Vehicles, of which the following is a specification.

My invention relates to a shock-absorber adapted for use on vehicles in general, and chiefly to landing chassis for aeroplanes, and which is characterized in that the shock absorbing members consist of elastic washers, made preferably of india rubber, which are guided by a central guiding rod and are separated from one another by metallic discs, said washers or discs being provided with means for preventing friction between the india rubber washers and the said guiding rod, the said means consisting either of metallic washers inserted in the mass of the india rubber washers, or of flanged or collar portions formed upon each metallic disc and surrounding the central aperture of the same, the elastic washers being given a suitable shape according to one or other case.

The shock-absorber according to the invention operates in a perfect manner and provides for a remarkably easy movement. It will last for a considerable time, since the elastic washers are held between metallic discs and all friction contact with the guide rod is obviated, so that the said washers are not subject to be injured.

The appended drawings show by way of example an embodiment of the invention.

Fig. 1 illustrates the landing chassis of an aeroplane provided with the said shock-absorber.

Fig. 2 is a cross-section of the elastic element of the shock-absorber.

Figs. 3 and 4 are respectively a cross-section and a plan view of the metallic washer incorporated into the mass of the india rubber washers.

Fig. 5 is a sectional view of a modification of the elastic element.

As shown in the drawings, the axle 1 is mounted upon the main body 2 of the aeroplane or other vehicle, by means of the two struts 3, 4 whereof the latter is elastic and consists of a tube 5 having slidable therein a member 6, forming a piston, and bearing upon the elastic washers 7, which are preferably of india rubber and are separated from one another by the metallic discs 8, whereby friction between said washers is obviated. Through the centre of the said washers and discs extends the guide rod 9, which is secured for instance to one end of the tube 5 and is urged at the other end by the spring 10 which ensures connection between the members 5 and 6 when the axle 1 is suspended.

To provide for the maximum elasticity and to obviate all wear of the india rubber washers 7, the latter are provided with metallic washers 11, Figs. 3 and 4, which are imbedded in the mass, projecting into the central hole and ensuring a loose and frictionless guiding upon the rod 9. The said washers 7 are not entirely cylindrical, but the upper and lower part is bevelled, Fig. 2, so that even should the washer be much flattened, it can readily resume the original shape without permanent distortion at the edges.

It should be observed that the washers 11 will aid in preventing the distortion of the rod 9 when the latter has a considerable length.

Fig. 5 shows a modification in which friction between the elastic washers 7 and the rod 9 is obviated by the use of the flanges or collar parts 12 formed upon the metallic discs 8 which separate the washers 7; the latter are further recessed at 7' so that friction against the rod cannot take place even when the washers are flattened.

Obviously, the above-mentioned arrangements are susceptible of all necessary modifications without departing from the spirit of the invention. In particular, the two arrangements for preventing friction between the said washers and the guide rod may be employed separately as described, or concurrently, in a given shock-absorber, a portion of the washers being provided with one arrangement and the second portion with the other.

Having now described my invention what I claim as new and desire to secure by Letters Patent is:

1. A shock absorber for aeroplanes and other vehicles comprising suspension members respectively connected to the body of the vehicle and the part adapted to engage with the ground, india rubber washers provided with central holes disposed between said members and adapted to work by compression, metal plates provided with central holes and inserted between said washers, the holes of said washers having a diameter larger than the holes of said metal plates, a common guiding rod secured to one of said suspension members, and extending through the holes in the washers and plates, and means for preventing friction between said washers and said guiding rod.

2. A shock absorber for aeroplanes and other vehicles comprising suspension members respectively connected to the body of the vehicle and the part adapted to engage with the ground, india-rubber washers provided with central holes disposed between said members and adapted to work by compression, metal plates provided with central holes and inserted between said washers, the holes of said washers having a diameter larger than the holes of said metal plates, a common guiding rod secured to one of said suspension members, and extending through the holes in the washers and plates, and metal washers imbedded in the mass of said india rubber washers and projecting into the central holes of the latter.

3. A shock absorber for aeroplanes and other vehicles comprising suspension members respectively connected to the body of the vehicle and the part adapted to engage with the ground, india-rubber washers provided with central holes disposed between said members and adapted to work by compression, metal plates provided with central holes and carrying centering flanges inserted between said washers, the holes of said washers having a diameter larger than the holes of said metal plates, a common guiding rod secured to one of said suspension members and extending through the holes in the washers and plates, and said metal plates being provided with inner flanges projecting into the central holes of said india-rubber washers.

In testimony whereof I have signed my name to this specification.

HENRY CHARLES ALEXANDRE POTEZ.